United States Patent
Bobay et al.

(10) Patent No.: US 10,232,823 B1
(45) Date of Patent: Mar. 19, 2019

(54) APPARATUS AND METHOD FOR PAIRING SMARTPHONE WITH VEHICLE TRACKING DEVICE

(71) Applicant: Spireon, Inc., Irvine, CA (US)

(72) Inventors: Frieda Bobay, Aliso Viejo, CA (US); Ben Tran, Yorba Linda, CA (US); Dru E. Barrios, Santa Ana, CA (US); Aticom Bussarakonsirivit, Eastvale, CA (US); Naueen K. Kakumani, Irvine, CA (US)

(73) Assignee: Spireon, Inc., Irvine, CA (US)

( * ) Notice: Subject to any disclaimer, the term of this patent is extended or adjusted under 35 U.S.C. 154(b) by 0 days.

(21) Appl. No.: 15/690,393

(22) Filed: Aug. 30, 2017

(51) Int. Cl.
 *B60R 25/10* (2013.01)
 *B60R 25/33* (2013.01)
 *B60R 25/102* (2013.01)

(52) U.S. Cl.
 CPC .......... *B60R 25/33* (2013.01); *B60R 25/102* (2013.01); *B60R 25/10* (2013.01); *B60R 2325/205* (2013.01)

(58) Field of Classification Search
 CPC .. B60R 25/33; B60R 25/102; B60R 2325/205
 USPC ....................................... 340/5.75
 See application file for complete search history.

(56) References Cited

U.S. PATENT DOCUMENTS

| | | | |
|---|---|---|---|
| 8,018,329 B2 | 9/2011 | Morgan et al. | |
| 8,653,956 B2 | 2/2014 | Berkobin et al. | |
| 8,823,502 B2 | 9/2014 | Berkobin et al. | |
| 9,423,807 B2 | 8/2016 | Kern, Jr. et al. | |
| 2014/0009284 A1* | 1/2014 | Slavin ................ | G08B 13/2402 340/539.13 |

* cited by examiner

*Primary Examiner* — Tanmay K Shah
(74) *Attorney, Agent, or Firm* — Luedeka Neely Group, P.C.

(57) ABSTRACT

A vehicle monitoring system prevents vehicle theft and unauthorized tampering by alerting the vehicle's owner of unexpected events. Alerts are provided to the owner within seconds of the occurrence while the owner is away from the vehicle. The vehicle monitoring can be set to automatically start whenever the vehicle is parked and the owner moves away to a specific distance. This allows the owner to set monitoring preferences once, after which the system automatically handles monitoring according to those preferences for future vehicle activities. The monitoring and alerting may be automatically disarmed when the vehicle owner again comes within the predetermined proximity of the vehicle. The monitoring may also be disarmed manually, such as when the owner lends the vehicle to another and does not need to track it. It also may be manually disarmed if the owner left his/her phone in a location far from the vehicle.

18 Claims, 5 Drawing Sheets

APPARATUS AND METHOD FOR PAIRING SMARTPHONE WITH VEHICLE TRACKING DEVICE

FIELD

This invention relates to the field of vehicle security and tracking. More particularly, this invention relates to a system for pairing a smartphone of a vehicle operator with a vehicle tracking device installed in the vehicle.

BACKGROUND

Vehicle tampering and theft of vehicles and/or property within vehicles is an ongoing problem for vehicle owners. Although many technology solutions have been proposed for monitoring vehicles to detect tampering or theft, none of the prior solutions provide for automatically arming a vehicle monitoring system based on simply parking the vehicle and the vehicle owner walking away, with no need for further action. In particular, no prior solution has compared the GPS coordinates of the vehicle to the GPS coordinates of the vehicle owner's smartphone to determine that the vehicle monitoring system is to be armed.

What is needed, therefore, is a vehicle monitoring system in which a vehicle tracking device is paired with the vehicle owner's smartphone, and in which the vehicle monitoring system is automatically armed to begin monitoring and providing tamper/theft alerts when the vehicle owner walks away from the vehicle with his or her smartphone.

SUMMARY

Embodiments of the invention described herein prevent car and property theft and unauthorized tampering by alerting the vehicle's owner of unexpected events. Alerts regarding unauthorized activities are provided to the vehicle owner within seconds or minutes of the occurrence while the owner is away from the vehicle. Nonlimiting examples of such unauthorized activities include shaking of the vehicle, towing or movement of the vehicle, unlocking a door, breaking glass, starting the ignition, the vehicle exiting a geofence (location boundary), loading or unloading of cargo (for cargo trailers), and activation special equipment such as a hydraulic lift (for vehicles so equipped).

Embodiments of the invention provide several advantages over prior vehicle monitoring systems. The vehicle monitoring and alerts can be set to automatically start each time the vehicle is parked and the vehicle owner moves away to a specific and configurable distance threshold. This allows the vehicle owner to set monitoring preferences once, after which the system automatically handles monitoring and alerting according to those preferences for every future trip and all vehicle activities.

In some embodiments, the monitoring and alerting is automatically disarmed when the vehicle owner again comes within the predetermined proximity of the vehicle. The monitoring and alerting can also be disarmed manually in scenarios in which the vehicle owner is lending the vehicle to someone else and does not need to track it. It also may be manually disarmed if the owner left his/her phone in a location far from the vehicle.

In some embodiments, the system provides for early detection of vehicle tampering or theft, and sends alert messages to apprise the vehicle owner of exactly what type of event has occurred so the owner can judge the severity of the event and respond appropriately. The sequence of alert messages indicate progressive levels of event severity, from shaking of the vehicle (such as from trying to pry the door), to actually having a door unlock/open event, to starting the car, to driving the car beyond a geofence perimeter. Preferred embodiments allow the vehicle owner to set preferences for the type or severity of events that will trigger an alert. The vehicle owner can receive alerts anywhere, as long as the vehicle owner's mobile phone and data access (either via cellular or wi-fi) are available. For example, the vehicle owner may receive alerts while in California regarding events occurring with a vehicle parked in Florida. Generally, alerts may be generated and received within seconds or minutes of the occurrence of a triggering event, the timing of which depends on the speed of the cellular and/or data network.

Preferred embodiments of the system described herein include a vehicle monitoring device installed in the vehicle that tracks and reports vehicle activities to a central server. Each specific event is recorded at the central server in association with a specific event code indicating the type of event that has occurred. The vehicle monitoring device may be an after-market device installed by the vehicle owner or a car dealer, or the device may be an OEM unit such as used in General Motor's OnStar' system. The system includes a software application that the vehicle owner installs on his/her smartphone or other mobile device. Using the smartphone application, the system detects the proximity of the vehicle owner's smartphone to the vehicle monitoring device and arms or disarms the automatic alert messaging function based on the detected proximity. In a preferred embodiment, proximity is detected based on comparing the GPS location of the vehicle monitoring device to the GPS location of the smartphone. Proximity may also be detected based on determining whether the smartphone is paired with the vehicle's Bluetooth system.

In one aspect, embodiments of the invention are directed to a vehicle monitoring system comprising a vehicle monitoring device, a mobile communication device, and a central vehicle monitoring server, all of which are in communication with a wireless data network. The vehicle monitoring device is configured to be installed in a vehicle, which may be a passenger automobile, a fleet vehicle, a tractor of a tractor/trailer rig, or a cargo trailer.

The vehicle monitoring device includes vehicle event sensors, a first Global Positioning System receiver, a first data processor, and a first wireless data transceiver. The vehicle event sensors are configured to generate vehicle event signals indicative of vehicle events. The first Global Positioning System receiver is configured to generate vehicle location information. The first data processor is configured to generate vehicle event information based on the vehicle event signals. The first wireless data transceiver is configured to transmit the vehicle location information and the vehicle event information via the wireless data network.

The mobile communication device includes a second Global Positioning System receiver, a second wireless data transceiver, a second data processor, and a display device. The second Global Positioning System receiver is configured to generate mobile communication device location information. The second wireless data transceiver is configured to transmit the mobile communication device location information and receive alert information via the wireless data network. The second data processor is configured to generate alert messages based on the alert information. The display device is configured to display the alert messages.

The central vehicle monitoring server executes software instructions to:

determine based on the vehicle location information and the mobile communication device location information whether a distance separating the mobile communication device from the vehicle exceeds a proximity distance threshold;

determine based on the vehicle event information whether a vehicle event has occurred;

generate the alert information if a vehicle event has occurred and the distance separating the vehicle and the mobile communication device exceeds the proximity distance threshold; and communicate the alert information to the mobile communication device via the wireless data network.

In some embodiments, the central vehicle monitoring server executes instructions to communicate an arm command message to the vehicle monitoring device via the wireless data network upon the distance separating the vehicle and the mobile communication device exceeding the proximity distance threshold. Based on receipt of the arm command message, the first data processor begins generating the vehicle event information based on the vehicle event signals.

In some embodiments, the central vehicle monitoring server executes instructions to communicate a disarm command message to the vehicle monitoring device via the wireless data network upon the distance separating the vehicle and the mobile communication device becoming less than the proximity distance threshold. Upon receipt of the disarm command message, the first data processor discontinues generating the vehicle event information based on the vehicle event signals.

In some embodiments, the vehicle event sensors include one or more of a motion sensor that generates a vehicle motion signal, a vehicle ignition state sensor that generates a vehicle ignition state signal, a door lock sensor that generates a vehicle door lock signal, and a cargo status sensor that generates a cargo status signal.

In some embodiments, the mobile communication device comprises a smartphone, a tablet computer, or a laptop computer.

In some embodiments, the vehicle monitoring device includes a first memory device for storing vehicle monitoring device identification information, and the mobile communication device includes a second memory device for storing mobile communication device identification information. The central vehicle monitoring server includes a database that associates the vehicle monitoring device identification information with the mobile communication device identification information.

In some embodiments, the first wireless data transceiver transmits the vehicle monitoring device identification information via the wireless data network, the second wireless data transceiver transmits the mobile communication device identification information via the wireless data network, and the central vehicle monitoring server associates data transmitted from the vehicle monitoring device with data transmitted from the mobile communication device based on the database association between the vehicle monitoring device identification information and the mobile communication device identification information.

In some embodiments, the alert information communicated to the mobile communication device via the wireless data network comprises a push notification, a text message, or an email message.

In some embodiments, the second data processor is operable to execute software instructions to receive input from a user of the mobile communication device to set the proximity distance threshold to a preferred value.

In one alternative embodiment, the following functions are performed by the second data processor of the mobile communication device rather than by a central server:

determining based on the vehicle location information and the mobile communication device location information whether the distance separating the mobile communication device from the vehicle exceeds the proximity distance threshold;

determining based on the vehicle event information that a vehicle event has occurred; and generating the alert information if a vehicle event has occurred and the distance separating the vehicle and the mobile communication device exceeds the proximity distance threshold.

Also in this alternative embodiment, the arm and disarm commands are generated by the second data processor of the mobile communication device rather than by a central server.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
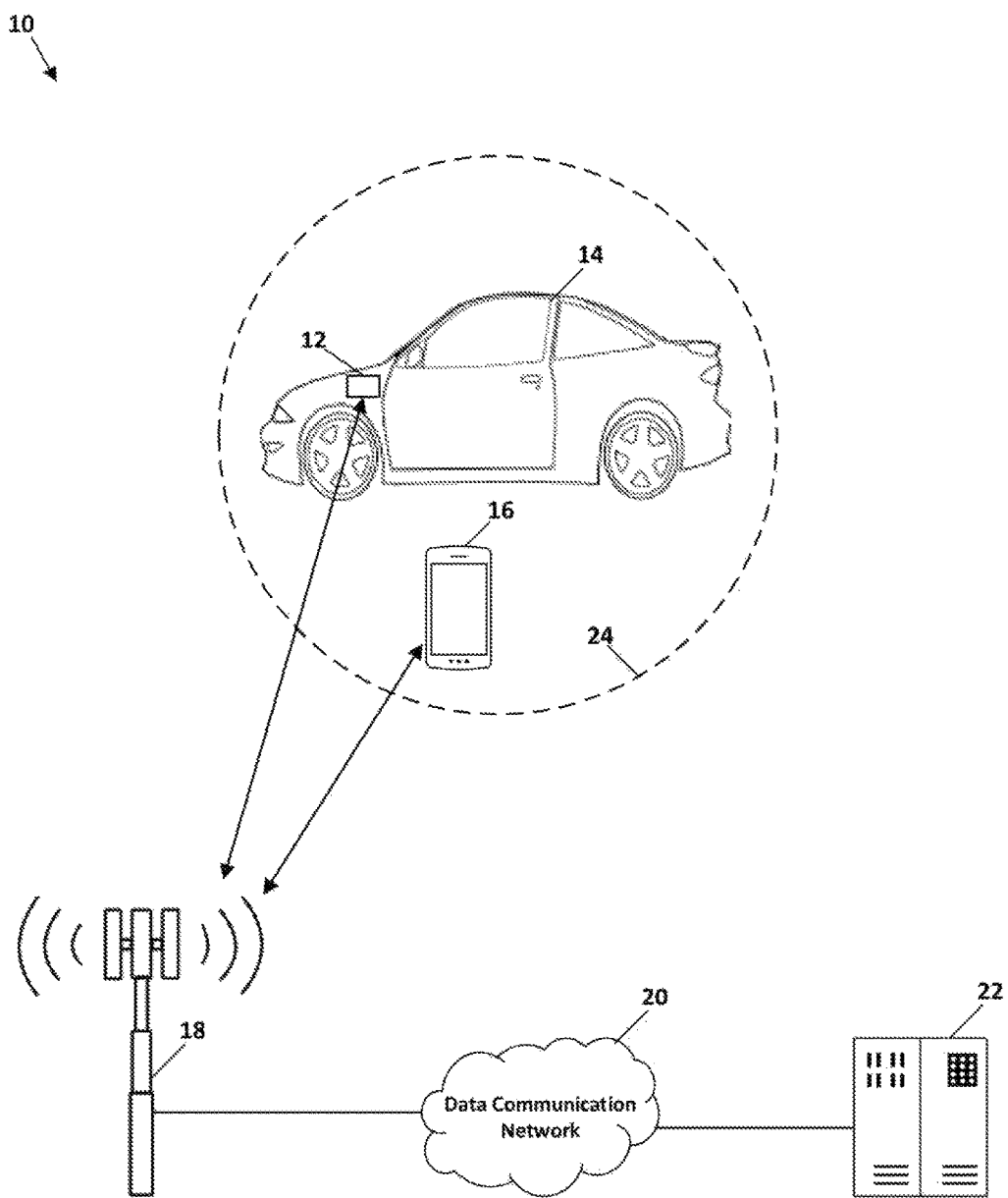
FIGS. 1 and 2 depict a vehicle monitoring system according to a preferred embodiment.
Figure 2:
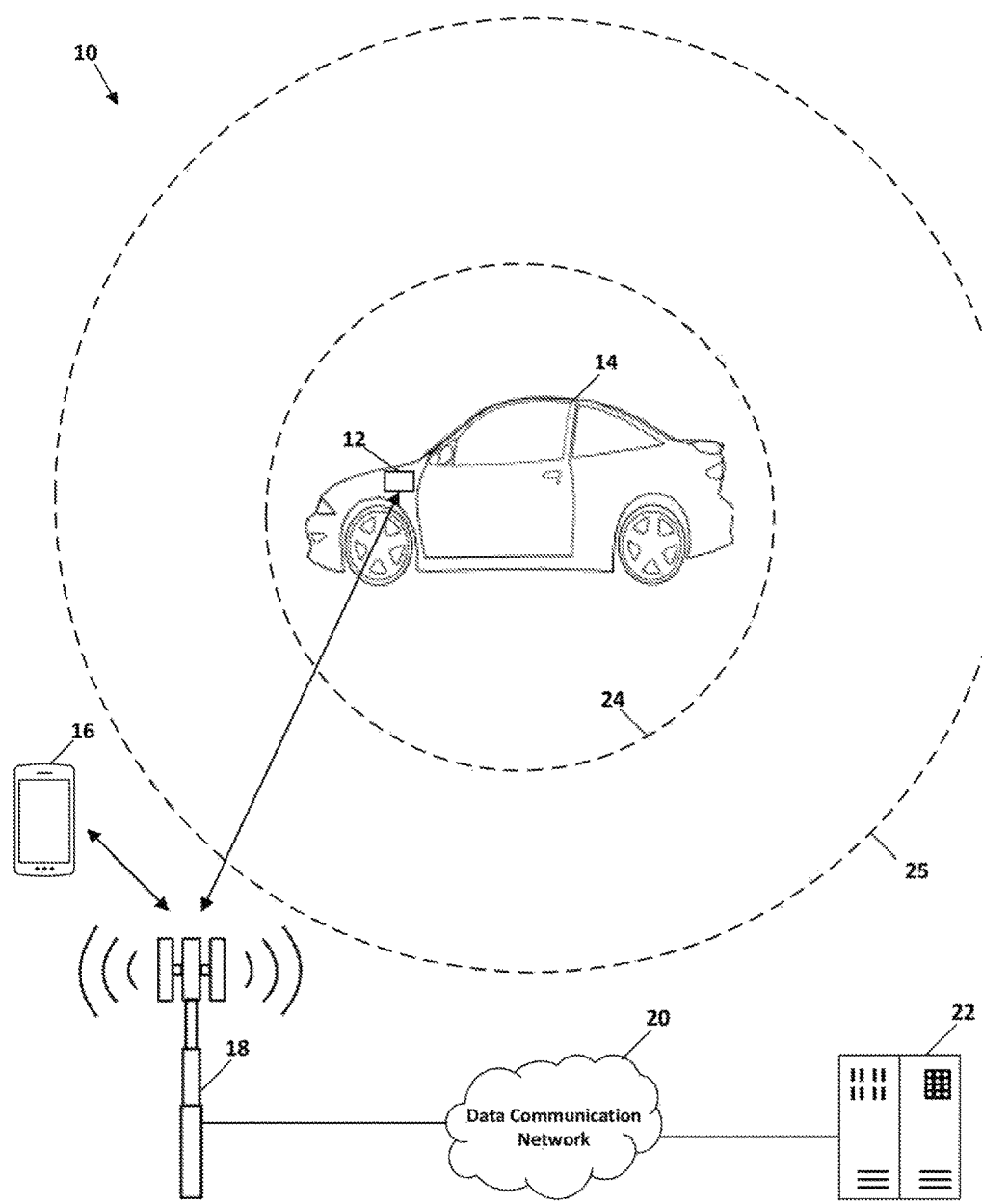

As shown in FIGS. 1 and 2, a preferred embodiment of a vehicle monitoring system 10 includes a vehicle monitoring device 12 installed within a vehicle 14, and a mobile communication device 16, such as a smartphone, operated by the owner of the vehicle 14. The vehicle monitoring device 12 and the vehicle owner's mobile device 16 are operable to wirelessly communicate data through a wireless data communication system 18, such as a cellular data network or a Wi-Fi network. The wireless data communication system 18 is connected to a wide area data communication network 20, such as the Internet. A central server 22 is also connected to the wide area data communication network 20. The central server 22 includes one or more processors, memory devices, and mass data storage devices for handling data processing and storage tasks as described herein.

Figure 3:
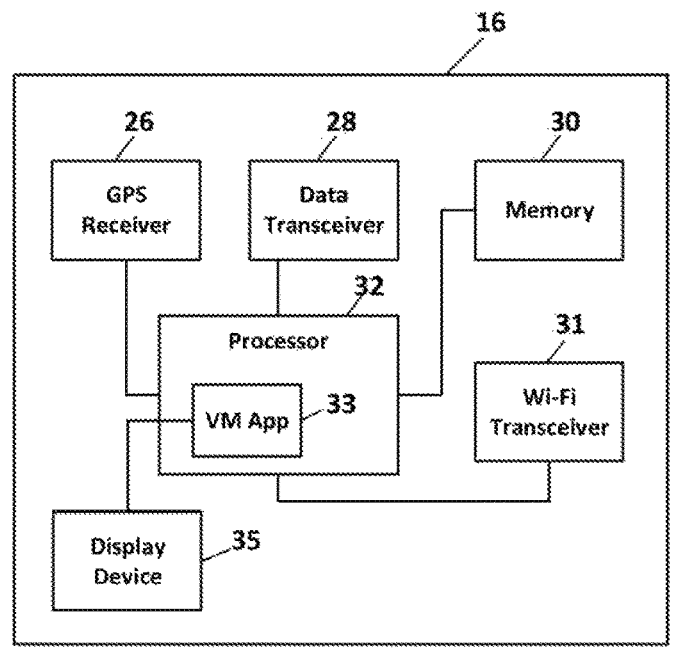
FIG. 3 depicts a vehicle owner's mobile device according to a preferred embodiment.

As shown in FIG. 3, the vehicle owner's mobile device 16 includes a Global Positioning System (GPS) receiver 26, a wireless data modem 28, memory 30, a Wi-Fi transceiver 31, a data processor 32, and a display screen 35. As discussed in more detail hereinafter, the processor 32 executes instructions provided in a vehicle monitoring software application 33. In a preferred embodiment, the mobile device 16 is a smartphone. In alternative embodiments, the mobile device 16 is a tablet or a laptop computer. The wireless data modem 28 may comprise a cellular data transceiver. The mobile device 16 is preferably powered by an internal battery.

Figure 4:
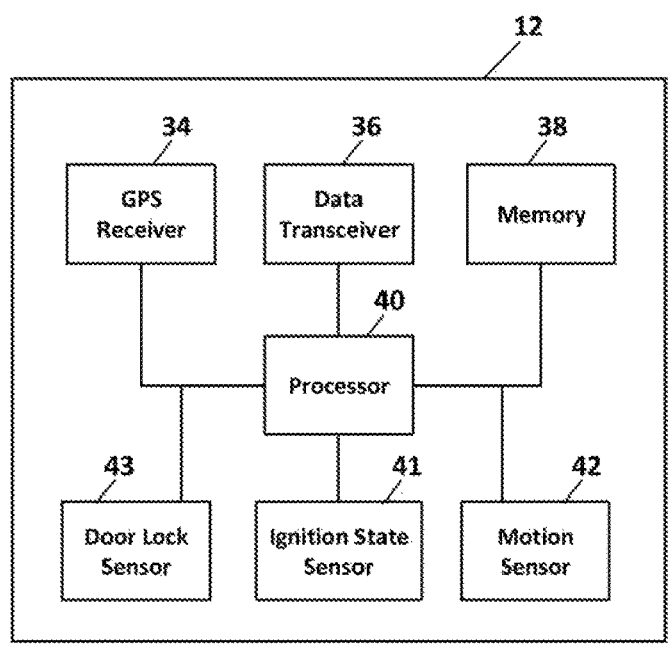
FIG. 4 depicts a vehicle monitoring and tracking device according to a preferred embodiment.

As shown in FIG. 4, the vehicle monitoring device 12 includes a GPS receiver 34, a wireless data modem 36, memory 38, a data processor 40, an ignition state sensor 41, a motion sensor 42, such as an accelerometer, and a door lock sensor 43. The wireless data modem 28 may comprise a cellular data transceiver. The vehicle monitoring device 12 is preferably powered by the vehicle's battery, but may also include an internal battery for backup purposes. In a preferred embodiment, the vehicle monitoring device is an after-market device installed by the vehicle owner or a car dealer. In an alternative embodiment, the device 12 is an OEM unit, such as used in General Motor's OnStar' system.

In some embodiments, the ignition state sensor 41 and the door lock sensor 43 are OEM components of the vehicle's electronics system. In these embodiments, the vehicle monitoring device 12 is connected to the vehicle's onboard diagnostics (OBD) port and receives signals from the ignition state sensor 41 and the door lock sensor 43 via the OBD port.

In some embodiments, the vehicle 14 is a cargo trailer in which a monitoring device 12 is installed. In these embodiments, the mobile device 16 belongs to a person, such as a truck driver, who is responsible for the security of the cargo trailer.

Figure 5:
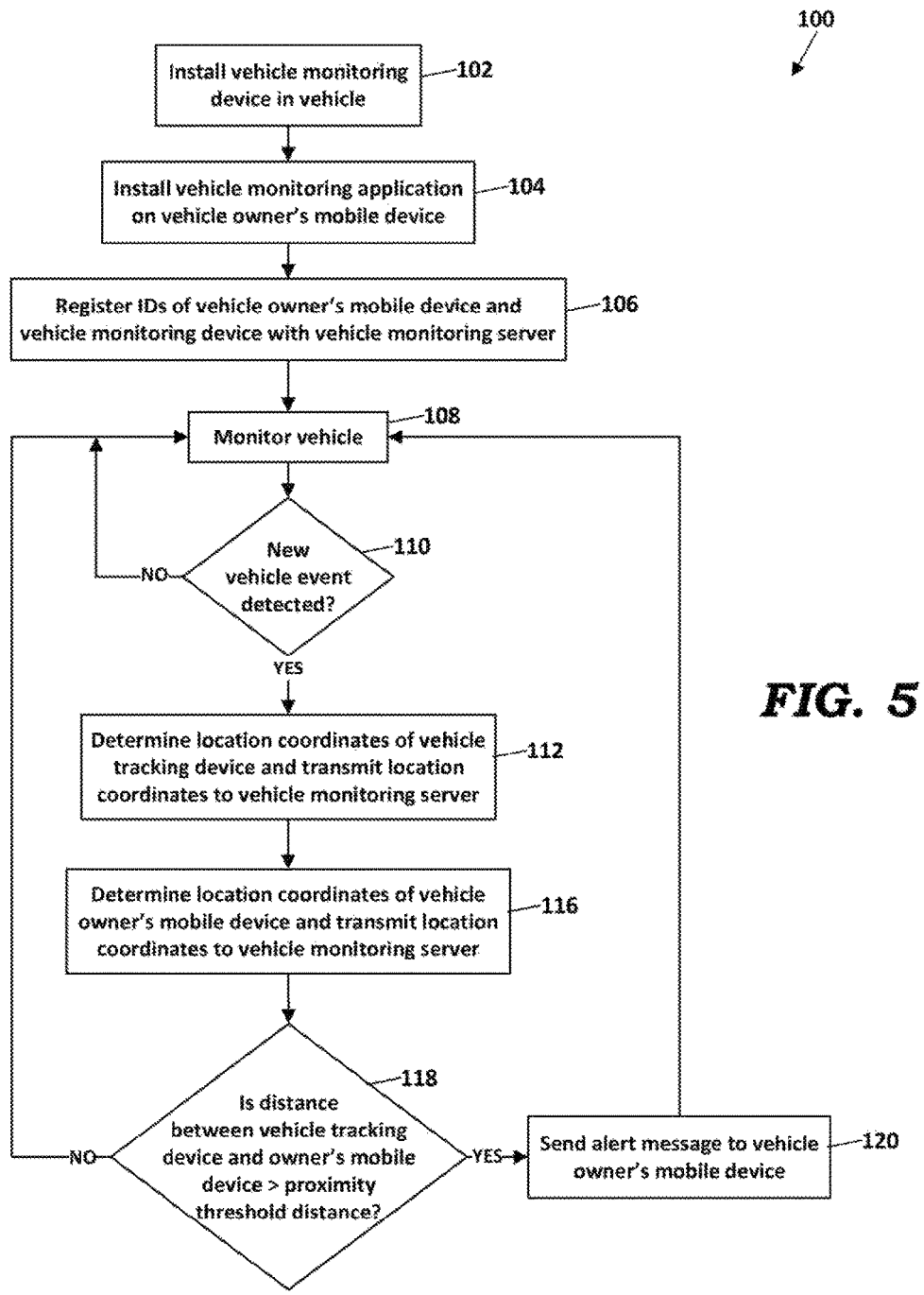
FIGS. 5 and 6 depict methods for monitoring a vehicle and proving alert messages to a vehicle owner's mobile device according to preferred embodiments.

A preferred embodiment of a method 100 for monitoring a vehicle and proving alert messages to a vehicle owner's mobile device 16 is depicted in FIG. 5. Some portions of the method are performed by the vehicle monitoring device 12 installed in the vehicle to be monitored (step 102), some portions are performed by the vehicle monitoring software application 33 installed in the vehicle owner's mobile device 16 (step 104), and some portions are performed by the central server 22. So that data from a particular vehicle monitoring device 12 is properly associated with data from a particular vehicle owner's mobile device 16, identification information for the vehicle monitoring device 12 is registered in a database on the central server 22 in association with identification information for the vehicle owner's mobile device 16 (step 106). For example, step 106 may be performed by a setup routine during installation of the vehicle monitoring software application 33 in the mobile device 16.

In preferred embodiments, whenever the vehicle 14 is parked and the ignition is off, the vehicle monitoring device 12 is armed to constantly monitoring the vehicle to detect certain events (step 108). These events include, but are not limited to, shaking of the vehicle, towing or movement of the vehicle, unlocking a door, breaking glass, starting the ignition, the vehicle exiting a geofence boundary 25 (see FIG. 2), loading or unloading of cargo (for cargo trailers), and activation special equipment such as a hydraulic lift (for vehicles so equipped). In a preferred embodiment, the central server 22 calculates the geofence boundary 25 centered on the location coordinates of the vehicle monitoring device 12 whenever the vehicle is parked. For example, as shown in FIG. 2, the geofence boundary 25 may be generally circular in shape, having a predetermined radius that is user-selectable using the vehicle monitoring software application 33.

When a new event is detected (step 110), location coordinates generated by the GPS receiver 34 indicating the location of the vehicle monitoring device 12 are transmitted from the data transceiver 36 of the vehicle monitoring device 12 via the wireless data communication system 18 and the wide area data communication network 20 to the central server 22 (step 112). Location coordinates generated by the GPS receiver 26 indicating the location of the mobile communication device 16 are transmitted from the data transceiver 28 of the mobile communication device 16 via the wireless data communication system 18 and the wide area data communication network 20 to the central server 22 (step 116). In some embodiments, step 116 is performed in response to a location request sent from the central server 22 to the mobile communication device 16. In other embodiments, step 116 is automatically performed at periodic intervals.

Based on the location coordinates of the vehicle owner's mobile device 16, the central server 22 determines whether the distance separating the mobile device 16 and the vehicle monitoring device 12 is greater than a proximity threshold distance 24, such as depicted in FIG. 1 (step 118). In a preferred embodiment, the proximity threshold distance 24 is user-selectable using the vehicle monitoring software application 33. In most cases, the proximity threshold distance 24 will be set to a relatively small distance, such as 20-30 feet. If the distance separating the vehicle owner's mobile device 16 and the vehicle monitoring device 12 is less than the proximity threshold distance 24 (as shown in FIG. 1), no alerts are issued and vehicle monitoring continues (step 108). If the distance separating the mobile device 16 and the vehicle monitoring device 12 is greater than the proximity threshold distance 24 (as shown in FIG. 2), the central server 22 generates an alert message that is sent via the wide area data communication network 20 and the wireless data communication system 18 to the mobile device 16 (step 120). The alert message, which may be a text message or email message, preferably includes information indicating the nature of the detected event and the time at which the event occurred. After the alert message is sent, vehicle monitoring continues (step 108).

In a preferred embodiment, the determination whether the distance separating the mobile device 16 and the vehicle monitoring device 12 is greater or less than the proximity distance threshold (step 118) is performed at the central server 22. In alternative embodiments, that determination may be made by the vehicle monitoring software application 33 running on the processor 32 of the mobile device 16. Thus, the invention is not limited to any particular processor performing any particular step in the method.

Figure 6:
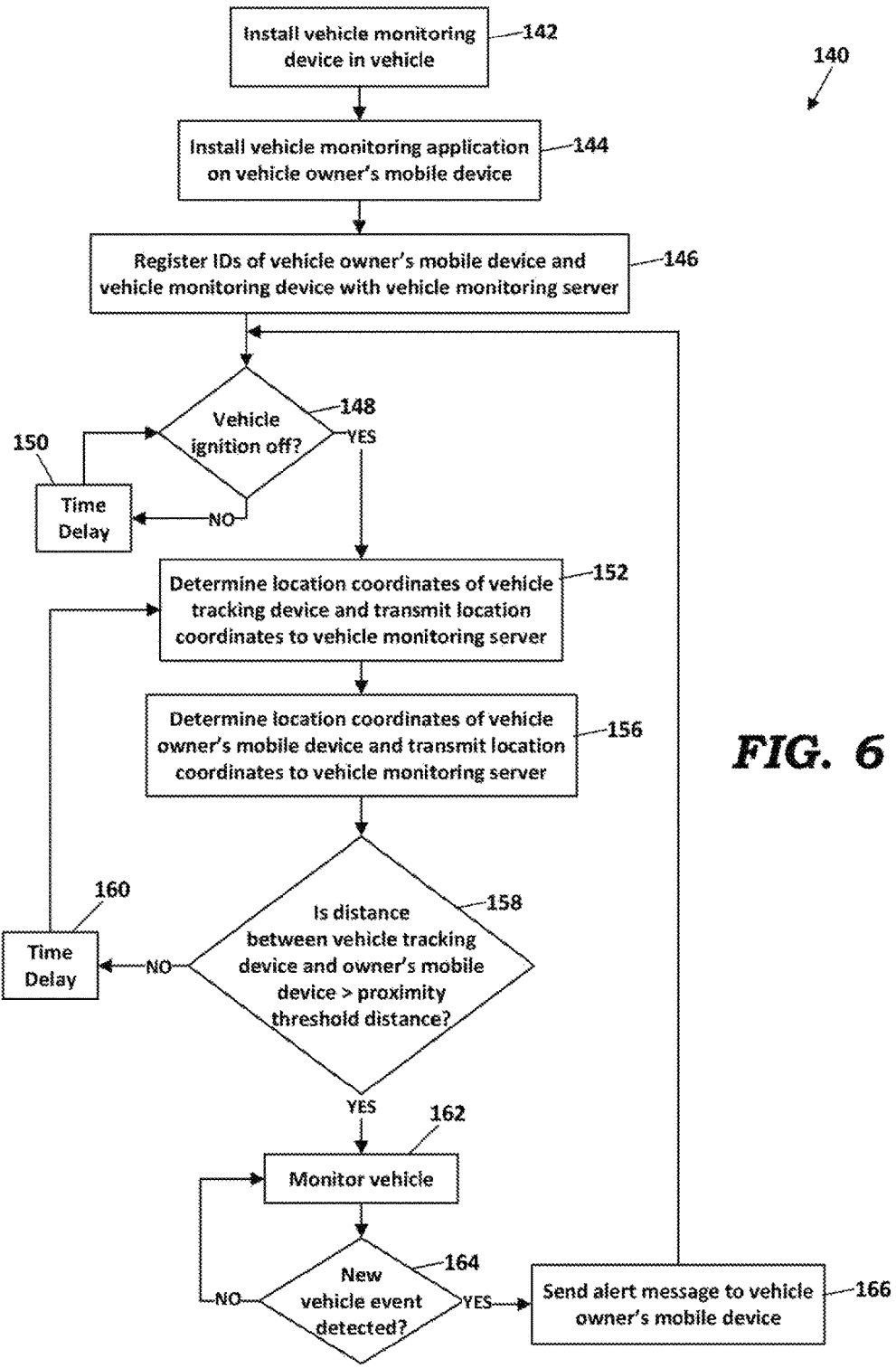

In an alternative embodiment depicted in FIG. 6, the steps of monitoring the distance between the mobile device 16 and the vehicle monitoring device 12 and comparing that distance to the proximity distance threshold 24 (steps 152, 156, and 158) are performed periodically, such as once every minute (step 160), for as long as the vehicle 14 is parked with the ignition off (step 148). If the proximity distance threshold 24 is not exceeded while the vehicle is parked (step 158), the monitoring system remains disarmed. If the proximity distance threshold 24 is exceeded while the vehicle is parked (step 158), the monitoring system is armed and begins monitoring the vehicle 14 for occurrences of events (step 162). When the mobile device 16 comes back within the proximity distance threshold 24 of the vehicle 14 (step 158), the monitoring system is disarmed again.

In some embodiments, if there is no communication with the mobile device 16 because it is in a location in which no data service is available or it is powered off, the system persists in the last state until communication is reestablished with the mobile device 16. For example, if the vehicle monitoring device 12 was in the armed mode when communications with the mobile device 16 were lost, it stays in the armed mode (no change of state) until communications with the mobile device 16 are reestablished.

In some embodiments, communication with the vehicle owner's mobile device 16 may be through Wi-Fi, such as when Wi-Fi is preferable due to cellular data costs or when a cellular data network is not available.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vehicle monitoring system comprising:
   a vehicle monitoring device configured for installation in a vehicle, the vehicle monitoring device comprising:
      one or more vehicle sensors for generating one or more vehicle event signals indicative of one or more vehicle events, wherein the one or more vehicle event signals include vehicle event information other than vehicle location information;
      a first Global Positioning Sensor receiver for generating vehicle location information;
      a first data processor for processing the vehicle event information; and
      a first wireless data transceiver in communication with a wireless data network, the first wireless data transceiver for transmitting the vehicle location information and the vehicle event information via the wireless data network;
   a mobile communication device comprising:
      a second Global Positioning System receiver for generating mobile communication device location information;
      a second wireless data transceiver in communication with the wireless data network, the second wireless data transceiver for transmitting the mobile communication device location information and receiving alert information via the wireless data network;
      a second data processor for generating alert messages based on the alert information; and
      a display device for displaying the alert messages; and
   a central vehicle monitoring server in communication with the wireless data network, the central vehicle monitoring server for executing instructions to:
      receive the vehicle location information, the vehicle event information, and the mobile communication device location information;
      determine based on the vehicle location information and the mobile communication device location information whether a distance separating the mobile communication device from the vehicle exceeds a proximity distance threshold;
      determine based on the vehicle event information whether a vehicle event has occurred;
      generate the alert information if a vehicle event has occurred and the distance separating the vehicle and the mobile communication device exceeds the proximity distance threshold; and
      communicate the alert information to the mobile communication device via the wireless data network.

2. The vehicle monitoring system of claim 1 wherein:
   the central vehicle monitoring server executes instructions to communicate an arm command message to the vehicle monitoring device via the wireless data network upon the distance separating the vehicle and the mobile communication device exceeding the proximity distance threshold;
   the first wireless data transceiver of the vehicle monitoring device is operable to receive the arm command message via the wireless data network; and
   based on receipt of the arm command message, the first data processor begins generating the vehicle event information based on the one or more vehicle event signals.

3. The vehicle monitoring system of claim 2 wherein:
   the central vehicle monitoring server executes instructions to communicate a disarm command message to the vehicle monitoring device via the wireless data network upon the distance separating the vehicle and the mobile communication device becoming less than the proximity distance threshold;
   the first wireless data transceiver of the vehicle monitoring device is operable to receive the disarm command message via the wireless data network; and
   based on receipt of the disarm command message, the first data processor discontinues generating the vehicle event information based on the one or more vehicle event signals.

4. The vehicle monitoring system of claim 1 wherein the one or more vehicle event sensors of the vehicle monitoring device comprise one or more of a motion sensor in a vehicle, a vehicle ignition state sensor in a vehicle, a door lock sensor in a vehicle, and a cargo status sensor in a vehicle, and wherein the one or more vehicle event signals comprise one or more of a vehicle motion signal, a vehicle ignition state signal, a vehicle door lock signal, and a cargo status signal.

5. The vehicle monitoring system of claim 1 wherein the mobile communication device comprises a smartphone, a tablet computer, or a laptop computer.

6. The vehicle monitoring system of claim 1 wherein:
   the vehicle monitoring device includes a first memory device for storing vehicle monitoring device identification information;
   the mobile communication device includes a second memory device for storing mobile communication device identification information; and
   the central vehicle monitoring server includes a database that associates the vehicle monitoring device identification information with the mobile communication device identification information.

7. The vehicle monitoring system of claim 6 wherein:
   the first wireless data transceiver transmits the vehicle monitoring device identification information via the wireless data network;
   the second wireless data transceiver transmits the mobile communication device identification information via the wireless data network; and
   the central vehicle monitoring server associates data transmitted from the vehicle monitoring device with data transmitted from the mobile communication device based on a database association between the vehicle monitoring device identification information and the mobile communication device identification information.

8. The vehicle monitoring system of claim 1 wherein the alert information communicated to the mobile communication device via the wireless data network comprises a push notification, a text message, or an email message.

9. The vehicle monitoring system of claim 1 wherein the second data processor is operable to execute software instructions to receive input from a user of the mobile communication device to set the proximity distance threshold to a preferred value.

10. The vehicle monitoring system of claim 1 wherein the vehicle monitoring device is configured for installation in a vehicle comprising a passenger automobile, a fleet vehicle, a tractor of a tractor/trailer rig, or a cargo trailer.

11. The vehicle monitoring system of claim 1 wherein the vehicle monitoring device is configured for installation in a trailer of a tractor/trailer rig and the mobile communication device is configured for installation in a cab of the tractor/trailer rig.

12. A vehicle monitoring system comprising:
a vehicle monitoring device configured for installation in a vehicle, the vehicle monitoring device comprising:
one or more vehicle sensors for generating one or more vehicle event signals indicative of one or more vehicle events, wherein the one or more vehicle event signals include vehicle event information other than vehicle location information;
a first Global Positioning Sensor receiver for generating vehicle location information;
a first data processor for processing the vehicle event information; and
a first wireless data transceiver in communication with a wireless data network, the first wireless data transceiver for transmitting the vehicle location information and the vehicle event information via the wireless data network;
a mobile communication device comprising:
a second Global Positioning System receiver for generating mobile communication device location information;
a second wireless data transceiver in communication with the wireless data network, the second wireless data transceiver for transmitting the mobile communication device location information and receiving alert information via the wireless data network;
a second data processor for executing instructions to:
determine based on the vehicle location information and the mobile communication device location information whether a distance separating the mobile communication device from the vehicle exceeds a proximity distance threshold;
determine based on the vehicle event information whether a vehicle event has occurred;
generate the alert information if a vehicle event has occurred and the distance separating the vehicle and the mobile communication device exceeds the proximity distance threshold; and
a display device for displaying the alert information.

13. The vehicle monitoring system of claim 12 wherein:
the second data processor executes instructions to communicate an arm command message to the vehicle monitoring device via the wireless data network upon the distance separating the vehicle and the mobile communication device exceeding the proximity distance threshold;
the first wireless data transceiver of the vehicle monitoring device is operable to receive the arm command message via the wireless data network; and
based on receipt of the arm command message, the first data processor begins generating the vehicle event information based on the one or more vehicle event signals.

14. The vehicle monitoring system of claim 13 wherein:
the second data processor executes instructions to communicate a disarm command message to the vehicle monitoring device via the wireless data network upon the distance separating the vehicle and the mobile communication device becoming less than the proximity distance threshold;
the first wireless data transceiver of the vehicle monitoring device is operable to receive the disarm command message via the wireless data network; and
based on receipt of the disarm command message, the first data processor discontinues generating the vehicle event information based on the one or more vehicle event signals.

15. The vehicle monitoring system of claim 12 wherein the one or more vehicle event sensors of the vehicle monitoring device comprise one or more of a motion sensor in a vehicle, a vehicle ignition state sensor in a vehicle, a door lock sensor in a vehicle, and a cargo status sensor in a vehicle, and wherein the one or more vehicle event signals comprise one or more of a vehicle motion signal, a vehicle ignition state signal, a vehicle door lock signal, and a cargo status signal.

16. The vehicle monitoring system of claim 12 wherein the mobile communication device comprises a smartphone, a tablet computer, or a laptop computer.

17. The vehicle monitoring system of claim 12 wherein the second data processor is operable to execute software instructions to receive input from a user of the mobile communication device to set the proximity distance threshold to a preferred value.

18. The vehicle monitoring system of claim 12 wherein the vehicle monitoring device is configured for installation in a vehicle comprising a passenger automobile, a fleet vehicle, a tractor of a tractor/trailer rig, or a cargo trailer.

* * * * *

UNITED STATES PATENT AND TRADEMARK OFFICE
CERTIFICATE OF CORRECTION

PATENT NO.         : 10,232,823 B1
APPLICATION NO.    : 15/690393
DATED              : March 19, 2019
INVENTOR(S)        : Bobay et al.

Page 1 of 1

It is certified that error appears in the above-identified patent and that said Letters Patent is hereby corrected as shown below:

On the Title Page

In the list of inventors:
Delete "Naueen K. Kakumani"
And insert --Naveen K. Kakumani--

Signed and Sealed this
Fourteenth Day of May, 2019

Andrei Iancu
*Director of the United States Patent and Trademark Office*